United States Patent Office 3,342,781
Patented Sept. 19, 1967

3,342,781
9,10-BIS(β-HYDROXYETHYL)OCTAHYDROAN-
THRACENE AND POLYESTERS THEREOF
Eckhard Christian August Schwarz, Grifton, N.C., assignor to E. I. du Pont de Nemours and Company, Wilmington, Del., a corporation of Delaware
No Drawing. Filed June 30, 1964, Ser. No. 379,383
3 Claims. (Cl. 260—75)

This invention relates to a novel class of polyesters, and to fibers, films, and other shaped articles produced therefrom. It further relates to certain novel dicarboxylic acids and diols useful for preparing such polyesters.

In accordance with the invention it has been found that certain hindered carbocyclic dicarboxylic acids as well as related carbocyclic diols can be used to prepare polyesters of unique physical properties including remarkable stability to commercial melt polymerization techniques.

The novel monomeric compounds of the invention and polyesters thereof contain a 1,2,3,4,5,6,7,8-octahydroanthracene radical. The monomers are 9,10-bis(β-hydroxyethyl)-1,2,3,4,5,6,7,8-octahydroanthracene, 9,10-bis(carboxymethyl) - 1,2,3,4,5,6,7,8 - octahydroanthracene, and ester-forming derivatives of the latter. In one embodiment of the invention there is formed a novel linear polyester of one or more organic diols and one or more polycarboxylic acids, at least one mol percent of either the total polycarboxylic acid components or total diol components or both being one of the aforementioned compounds or derivatives. Such a polyester will thus be homopolymeric or copolymeric and will comprise recurring units of the formula

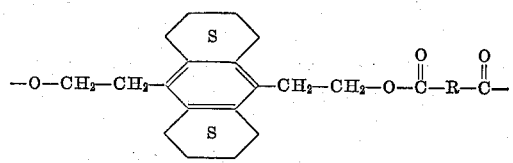

or of the formula

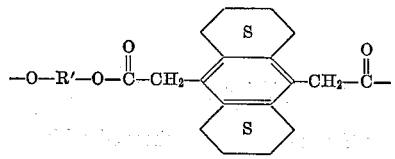

In these formulas R is the radical remaining after removal of the carboxyl groups from an organic dicarboxylic acid and is either a covalent bond or a divalent organic radical, and R' is the radical remaining after removal of the hydroxyl groups from an organic diol and is a divalent organic radical. In fiber form such a linear polyester will have an intrinsic viscosity of at least 0.3, as measured in solution at 25° C. in one part by volume of trifluoroacetic acid and three parts by volume of methylene chloride.

Homopolyesters of the above units, e.g., as consisting essentially of either of the above units wherein the R or R' radical is the same throughout the polymer molecule, are generally crystalline, high melting, and are stable to conditions used in commercial melt polymerization and spinning techniques. Accordingly, they are well suited to the formation of fibers, films and other useful shaped articles. Copolyesters are similarly useful and, as will be described in greater detail in subsequent paragraphs, offer special advantages when formed of particular repeating units. In the case of polyesters of 9,10-bis(carboxymethyl) - 1,2,3,4,5,6,7,8-octahydroanthracene it is significant that these are greatly superior to those of p-phenylene diacetic acid. Whereas the α-methylene groups of the latter suffer easily oxidative degradation or crosslinking at elevated temperatures, those of the former are sterically protected by the bulky octahydroanthracene group.

In a preferred embodiment of the invention, novel copolyesters are formed from ethylene glycol with a mixture of 90 to 99 mol percent terephthalic acid and 10 to 1 mol percent 9,10 - bis(carboxymethyl)-1,2,3,4,5,6,7,8-octahydroanthracene. Such a copolyester will thus have recurring units consisting essentially of those represented by the formulas

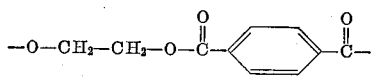

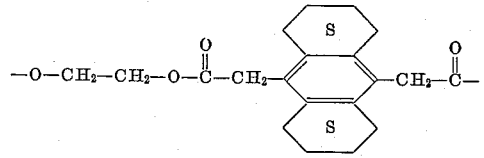

wherein the ratio of the units is within the range of 90/10 to 99/1, respectively. Fibers of such a linear copolyester will have an intrinsic viscosity of at least 0.3, as measured in solution at 25° C. in one part by volume of trifluoroacetic acid and three parts by volume of methylene chloride.

It has been frequently suggested in the prior art to improve one or more physical properties of the well-known polyethylene terephthalate polymer to gain superior performance in certain fiber applications. In many cases an improved level of dyeability, for example, has been achieved by the substitution of a portion of the repeating ethylene terephthalate units by other units. For the most part, however, the attainment of superior performance with respect to one property such as dyeability has been accompanied by losses in other important fiber properties, notably modulus and recovery. Frequently, too, the introduction of the copolymerizing unit will result in an excessive depression in melting point.

The above copolyesters of the invention are particularly unique in that compared to homopolymeric polyethylene terephthalate they give an improved dye rate with disperse dyes and yet, at least after a normal finishing operation, exhibit suitable properties with respect to modulus and recovery.

In general, fibers of these copolyesters will have modulus values considerably above those of a polyethylene terephthalate fiber after both have been subjected to a similar finishing treatment. These same copolyester fibers will have only a nominal increase in boil off shrinkage and yet for the most part will retain tenacity and elongation properties comparable to those of polyethylene terephthalate. These copolyesters will also have polymer melt temperatures only slightly below those of homopolymeric polyethylene terephthalate, the extent of the difference depending upon the percentage of the respective dicarboxylic acid constituents. Substantially higher molecular weights and accordingly higher polymer melt temperatures may be obtained, however, by employing solid phase polymerization procedures.

The novel homopolyesters and copolyesters are well suited to a variety of applications. Those of sufficiently high intrinsic viscosity can be melt spun into filaments or cast from solutions to form self-supporting films. The substantially improved modulus properties of the copolyester filaments make them particularly advantageous for use in safety belts, V-belt reinforcement, fire hose, cordage, sewing thread, sail-cloth, etc. Lower molecular weight polymers may be used as adhesives.

A convenient method for preparing the polyesters of the invention involves reaction of one or more diols with the dimethyl esters of one or more dicarboxylic acids in the desired proportion in an ester interchange reaction followed by polycondensation at high temperature and at low partial pressure of the diols, until a polymer of the desired molecular weight is produced. Either the diol or the dicarboxylic acid reactants or both may comprise the novel octahydroanthracene compounds of the invention. In carrying out the ester interchange reaction in the preparation of the preferred copolyesters, at least one molecular proportion of ethylene glycol per molecular proportion of the mixed esters should be used, preferably about 1.5 to 2.1 mols of glycol per mol of the esters. It is advantageous to employ catalysts to accelerate the rate of reaction, and it has been found that manganous acetate, calcium acetate, and sodium methoxide are suitable ester interchange catalysts while antimony trioxide, litharge, and the tetra-alkyl titanates such as tetraisopropyl titanates are suitable polycondensation catalysts.

Instead of reacting the diol or diols with dimethyl esters of the acids, other esters of the acids may be used, especially other lower alkyl esters, phenyl esters, or the like. The polyesters may also be prepared by reacting the acid or acids directly with the diol or diols, or with esters of the diols with acetic acid or other lower aliphatic acids. Other equivalent methods may also be employed.

The 9,10 - bis(carboxymethyl) - 1,2,3,4,5,6,7,8 - octahydroanthracene, either alone or along with one or more other dicarboxylic acids, may be reacted with a wide variety of diols of the formula $R'(OH)_2$ to form one class of the novel polyesters of the invention. Thus $R'$ may be aliphatic, aromatic, or cycloaliphatic and may be either hydrocarbon, as is preferred, or may contain ether, thioether, or other linkages. Typically suitable diols are ethylene glycol, butylene glycol, hexamethylene glycol, decamethylene glycol, polyethylene and polypropylene ether glycols of M.W. 200 to 10,000, trans - 1,4 - bis-(hydroxymethyl)cyclohexane, 3,6 - bis($\beta$ - hydroxyethyl) durene, trans/trans-1,1'-bicyclohexane - 4,4' - dimethanol, bisphenol A, and the like. The 9,10-bis($\beta$-hydroxyethyl)-1,2,3,4,5,6,7,8-octahydroanthracene, either alone or along with one or more other diols such as above described, may be reacted with a wide variety of dicarboxylic acids of the formula $R(COOH)_2$ to form other novel polyesters in accordance with the invention. Among various dicarboxylic acids which may be used are adipic acid, sebacic acid, hexahydroterephthalic acid, terephthalic acid, 2,6- or 2,7-naphthalic acid, diphenoxyethane-4,4'-dicarboxylate, bis-carboxyphenyl ketone, and p,p'-sulphonyldibenzoic acid. In place of the dicarboxylic acids their corresponding ester-forming derivatives may be used, i.e., derivatives which readily undergo polyesterification with a diol or derivative thereof. For example, a lower alkyl ester of the dicarboxylic acid may be used, such as the dimethyl ester. Alternatively, acid chlorides of the dicarboxylic acids may be used.

The expression "polymer melt temperature" employed with respect to the products of this invention is the minimum temperature at which a sample of the polymer leaves a wet molten trail as it is stroked with moderate pressure across a smooth surface of a heated metal. "Polymer melt temperature" has sometimes in the past been referred to as "polymer stick temperature."

The term "intrinsic viscosity," as used herein, is defined as the limit of the fraction ln $(r)/c$, as $c$ approaches O, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

In the examples, values of tenacity in g.p.d., elongation in percent, and initial modulus in g.p.d. (all expressed as "T/E/Mi") are determined upon polyester fibers which have been spun and drawn as indicated. Measurements are made before and after a finishing procedure which comprises the consecutive steps of:

(a) Heat treating the filaments by boiling them in water for 15 minutes while allowing 3% shrinkage in length, (b) Heating the filaments in an oven at 180° C. for 3 minutes, again allowing 3% shrinkage in length, (c) Heat treating the filaments by boiling them in water for 15 minutes while allowing 1% shrinkage in length, and finally (d) Air drying the filaments.

The disperse dye test referred to in the examples is indicative of the rate at which the fibers will accept a dye. According to the test the fibers are dyed employing an aqueous bath containing 20% (based on the weight of the fiber) of a yellow disperse dye comprising 3'-hydroxyquinophthalone at 100° C. for 90 minutes, using a 1000 to 1 ratio of bath to fiber. Fiber samples removed from the dye bath at intervals of 9, 16 and 25 minutes are rinsed, dried, and then analyzed quantitively for percentage dye adsorbed by extracting the dye with hot chlorobenzene and determining the amount of dye spectrophotometrically. A plot of the amount of dye adsorbed per gram of fiber vs. the square root of time shows the dye rate (slope of the line connecting the points) which is then compared with the dye rate of polyethylene terephthalate.

In the following examples a number of the polymerizations were performed using as a catalyst a solution of sodium hydrogen hexabutyltitanate, $NaHTi(OBu)_6$. This was prepared by dissolving 1 g. of sodium in 200 ml. of n-butyl alcohol, then adding to this solution 15.0 g. of tetra-n-butyl titanate.

This invention is further illustrated, but is not intended to be limited, by the following examples in which parts and percentages are by weight, unless otherwise specified.

*Example 1*

Preparation of 9,10-bis(carboxymethyl)-1,2,3,4,5,6,7,8-octahydroanthracene of the formula

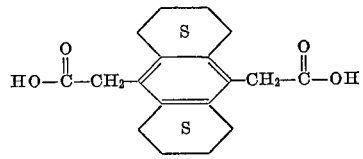

(a) Chloromethylation of 1,2,3,4,5,6,7,8-octahydroanthracene.

A 3-liter, 3-neck flash was charged with

| | |
|---|---:|
| 1,2,3,4,5,6,7,8-octahydroanthracene, g. | 100 |
| Zinc chloride, g. | 100 |
| Paraformaldehyde, g. | 100 |
| Conc. hydrochloric acid (36%), ml. | 500 |

The mixture was rapidly stirred on the steam bath for seven hours under reflux, then cooled to 10° C. A creamy layer separated on top of the hydrochloric acid layer. The liquid was decanted and the creamy layer washed with water. After decanting the water, 1½ liters acetone was added and the mixture stirred on the steam bath for 15 minutes. By this time the creamy layer had disintegrated into the particles which were filtered off and recrystallized from dioxane-water, a 90/10 mixture by volume. The crystals had a melting point of 205° C.

(b) Preparation of 9,10-bis(cyanomethyl)-1,2,3,4,5,6,7,8-octahydroanthracene.

100 g. of the bis(chloromethyl) compound prepared above was refluxed under stirring in 1000 ml. propanol in a 2-liter, 3-neck flask. 65 g. of potassium cyanide and 1.0 g. of potassium iodide in 80 ml. of water were added and the suspension was refluxed for 3 hours. Infrared spectroscopy indicated the formation of a nitrile by the appearance of the nitrile band at 2280 cm.$^{-1}$ and disappearance of the chlorine band at 730 cm.⁻¹. The mixture was cooled, filtered and the product washed with water on filter paper.

(c) Preparation of 9,10-bis(carboxymethyl)-1,2,3,4,5,6,7,8-octahydroanthracene and ester-forming derivatives thereof.

The bis-nitrile prepared above was suspended in 500 ml. ethylene glycol and rapidly stirred in a 3-liter, 3-neck flask. 200 g. potassium hydroxide in 100 ml. water were added. The reaction mixture was refluxed for 6 hours (reflux temperature 180° C.) with nitrogen blowing through the stirred mixture. The mixture was then cooled to 100° C., diluted with 500 ml. water, filtered and the filtrate acidified with 10% HCl (aqueous). The dicarboxylic acid precipitate formed, was filtered off, washed, dried, and then refluxed under stirring in 1500 ml. methanol containing 25 ml. conc. H₂SO₄ and 150 g. anhydrous calcium sulfate. After stirring the suspension for 2 days, the calcium sulfate was filtered off, the filtrate condensed to 500 ml. and cooled. The crystals formed had a M.P. of 149° C. The presence of ester groups was confirmed by infrared spectroscopy.

120 g. of 9,10-bis(carboxymethyl)-1,2,3,4,5,6,7,8-octahydroanthracene obtained above was refluxed in 500 ml. of thionyl chloride for 3 hours. By this time, gas evolution had ceased. Thionyl chloride was distilled off on the steam bath using aspirator vacuum, and 1500 ml. methanol containing 100 ml. of pyridine was added and the mixture refluxed for 30 minutes. On cooling the dimethyl ester crystallized out and was filtered off, M.P. 143° C.

Calculated for $C_{20}H_{26}O_4$: C=72.7%; H=7.94%; O=19.35%. M.W.=330.41. Found: C=72.5%; H=7.81%; O=19.4%.

Ester-forming ionic salts of the 9,10-bis(carboxymethyl)-1,2,3,4,5,6,7,8-octahydroanthracene compound can be prepared by reacting the dicarboxylic compound with excess ammonium hydroxide, sodium hydroxide or other alkali metal hydroxides in the known manner The di-β-hydroxyethyl ester of the dicarboxylic compound can be formed by reaction of the diacid chloride of the latter with a large excess of ethylene glycol.

Example II

Preparation of 9,10-bis(β-hydroxyethyl)-1,2,3,4,5,6,7,8-octahydroanthracene of the formula

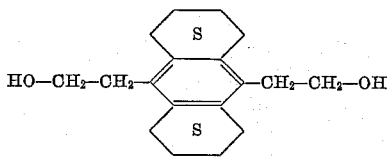

In a 3-liter, 3-neck flask, fitted with stirrer, condenser and dropping funnel, were placed. 15.0 g. lithrium aluminum hydride dissolved in 454 g. diethyl ether. Through the dropping funnel 48.0 g. of the dimethyl ester of 9,10-bis(carboxymethyl)octahydroanthracene, prepared in Example I, dissolved in 454 g. diethyl ether and 200 ml. tetrahydrofurane, were gradually added. On completion of the addition, stirring was continued for 2 hours under refluxing. Then 35 ml. of ethylacetate and 150 ml. conc. HCl in 150 ml. water were added dropwise. The ether layer was separated and washed with 200 ml. water twice. The ether layer was then evaporated on the steam bath, and the residual produce recrystallized from p-xylene: M.P. 236° C. The combined aqueous phases were heated to 90° C. for 2 hours, and the solids filtered off, dissolved in p-xylene, filtered hot, and recrystallized, M.P. 236° C.

Infrared spectroscopy indicated complete reduction by the disappearance of the carbonyl-band at 1725 cm.⁻¹ and the appearance of the hydroxy-band at 3450 cm.⁻¹.

Calculated for $C_{20}H_{26}O_2$: C=78.8%; H=9.56%. M.W.=274.39; C=78.5%; H=9.3%.

Example III

Homopolyester of 9,10-bis(carboxymethyl)-1,2,3,4,5,6,7,8-octahydroanthracene and trans-1,4-bis(hydroxymethyl)-cyclohexane. The polymer has the formula

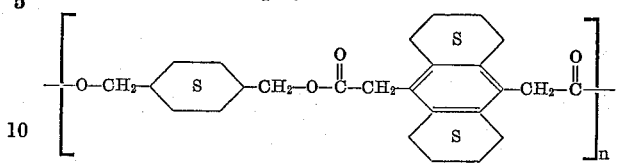

wherein n is an integer indicative of the number of repeating units and preferably is sufficiently large to give an intrinsic viscosity of at least 0.3.

Into a standard polymer tube were placed 5.4 g. of the dimethyl ester of 9,10-bis(carboxymethyl)-1,2,3,4,5,6,7,8-octahydroanthracene, 4.0 g. of trans-1,4-bis(hydroxymethyl)cyclohexane and NaHTi(OBu)₆ solution (0.2 ml.). The tube was heated in a bath at 240° C. for 30 minutes at atmospheric pressure with the evolution of methanol. The temperature was then raised to 280° C. under vacuum (0.4 mm. Hg) and this continued for 3½ hours. Upon cooling a crystalline polymer was formed having a polymer melt temperature of 137° C. and an intrinsic viscosity of 0.25. Upon recrystallizing the polymer from methylene chloride, the polymer melt temperature (crystalline melting point) was raised to 187–192° C.

Example IV

Hompolyester of 9,10-bis(β-hydroxyethyl)-1,2,3,4,5,6,7,8-octahydroanthracene and 2,5-dimethylterephthalic acid. The polymer has the formula

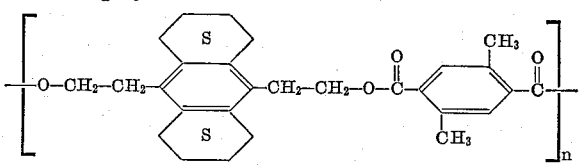

wherein n is an integer indicative of the molecular weight and is preferably at least 0.3.

Using 1.274 g. of the dimethyl ester of 2,5-dimethylterephthalic acid, 2.38 g. of the above diol, and NaHTi(OBu)₆ solution (0.1 ml.), the polymerization was conducted as described in Example II except that the initial heating at atmospheric pressure was conducted at 295° C. for 15 minutes and the final heating at reduced pressure was conducted at 315° C. for 1 hour. The resulting polymer had a polymer melt temperature of 295° C. and an intrinsic viscosity of 0.30. Fibers could be melt spun from the polymer.

Example V

Copolyester of ethylene glycol with a mixture of 95 mol percent terephthalic acid and 5 mol percent 9,10-bis (carboxymethyl) - 1,2,3,4,5,6,7,8 - octahydroanthracene. The polymer is composed of recurring units of the formulas

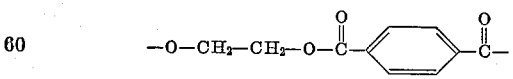

and

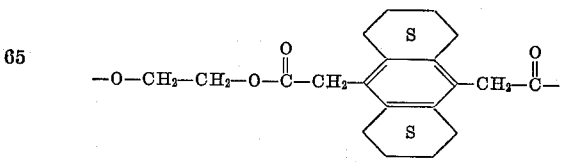

wherein the ratio of the units is 95/5, respectively.

A polymer tube was charged with:

Dimethylterephthalate 30.0 g. (0.155 mol);
Dimethyl ester of bis(carboxymethyl)-1,2,3,4,5,6,7,8-octahydroanthracene 2.80 g. (0.0086 mol);
Ethylene glycol, 8.0 ml.;

Ethylene glycol, containing 0.002 g./ml. Sb$_2$O$_3$, 6.0 ml.;
Ethylene glycol, containing 0.002 g./ml. manganous acetate, 8.0 ml.

The reaction mixture was heated at 198° C. for 1.75 hours. The temperature was then raised to 185° C. and vacuum applied (0.4 mm. Hg) for 2 hours and then at 295° C. for 1.5 hours. Upon cooling, a crystalline copolymer was obtained having a polymer melt temperature of 255–260° C. and an intrinsic viscosity of 0.44. Further polymerization in the solid state at 0.25 mm. Hg. was conducted for 2 hours at 240° C. and then for 2 additional hours at 248° C. The intrinsic viscosity increased only slightly.

Fibers were melt spun from the polymer, drawn in length over a heated shoe, and various properties measured thereon. A control sample, similarly prepared, was a homopolymer of ethylene glycol and terephthalic acid. Data obtained from fibers of the sample versus those of the control are as follows:

|  | Control | Copolyester |
|---|---|---|
| Polymer melt temperature, ° C. | 260 | 255–260 |
| Intrinsic Viscosity (polymer) | 0.65 | 0.44 |
| Spinning Temp., ° C. | 285 | 265 |
| Draw Ratio | 4.5X | 4.4X |
| Draw (Heated Shoe) Temp., ° C. | 115 | 90 |
| Denier (after draw) | 8.6 | 16.2 |
| T/E/Mi: |  |  |
| Before finish | 4/19/119 | 2.2/14/116 |
| Finished | 3.6/27/61 | 2.1/17/77 |
| Disperse Dye Rate (Relative to homopolymer) | 1 | 2.1 |

The finished fibers thus exhibited a substantially improved dye rate and modulus as compared to polyethylene terephthalate fibers.

As many widely different embodiments of this invention may be made without departing from the spirit and scope thereof, it is to be understood that this invention is not to be limited to the specific embodiments thereof except as defined in the appended claims.

What is claimed is:
1. 9,10 - bis(β-hydroxyethyl) - 1,2,3,4,5,6,7,8-octahydroanthracene.
2. A linear polyester consisting essentially of recurring units of the formula

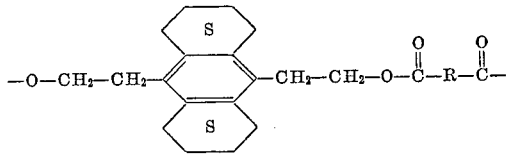

wherein R is the radical remaining after removal of the carboxyl groups from a dicarboxylic acid selected from the group consisting of oxalic acid, adipic acid, sebacic acid, hexahydroterephthalic acid, terephthalic acid, 2,5-dimethylterephthalic acid, 2,6-naphthalic acid, 2,7-naphthalic acid, diphenoxyethane-4,4'-dicarboxylate, bis-carboxyphenyl ketone, p,p'-sulphonyldibenzoic acid.
3. A linear polyester of 9,10-bis(β-hydroxyethyl)-1,2,3,4,5,6,7,8-octahydroanthracene and 2,5-dimethylterephthalic acid.

References Cited

UNITED STATES PATENTS 3,244,674   4/1966   Kolobielski _____ 260—75

FOREIGN PATENTS 885,049   8/1959   Great Britain.

WILLIAM H. SHORT, *Primary Examiner.*

R. T. LYON, *Assistant Examiner.*